(12) United States Patent
Liden (10) Patent No.: US 9,231,897 B1
(45) Date of Patent: Jan. 5, 2016

(54) ESTIMATED VALUE RATINGS FOR ELECTRONIC MESSAGES

(75) Inventor: Lars H. Liden, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1183 days.

(21) Appl. No.: 12/987,258

(22) Filed: Jan. 10, 2011

(51) Int. Cl.
*G06F 13/00* (2006.01)
*H04L 12/58* (2006.01)
*G06Q 10/10* (2012.01)

(52) U.S. Cl.
CPC ............... *H04L 51/12* (2013.01); *G06Q 10/10* (2013.01)

(58) Field of Classification Search
CPC ..... H04L 51/12; H04L 12/585; H04L 63/102; H04L 63/123; H04L 65/1079; H04L 51/08; H04L 67/306; H04L 12/583; G06F 17/3053; G06F 17/30867; G06F 17/30997; G06Q 10/107; G06Q 10/10
USPC .......................... 709/206, 205, 217–219, 316
See application file for complete search history.

(56) References Cited

U.S. PATENT DOCUMENTS

| | | | |
|---|---|---|---|
| 6,578,025 B1 * | 6/2003 | Pollack et al. | |
| 7,275,082 B2 * | 9/2007 | Pang | 709/206 |
| 7,756,929 B1 * | 7/2010 | Pettigrew et al. | 709/206 |
| 2005/0086307 A1 * | 4/2005 | Kelley et al. | 709/206 |
| 2005/0125307 A1 * | 6/2005 | Hunt et al. | 705/26 |
| 2006/0253537 A1 * | 11/2006 | Thomas | 709/206 |
| 2009/0204676 A1 * | 8/2009 | Parkinson et al. | 709/206 |
| 2009/0271373 A1 * | 10/2009 | Mandel et al. | 707/3 |
| 2010/0223341 A1 * | 9/2010 | Manolescu et al. | 709/206 |
| 2011/0184937 A1 * | 7/2011 | Jin et al. | 707/722 |
| 2012/0005282 A1 * | 1/2012 | Steinbok et al. | 709/206 |
| 2012/0042025 A1 * | 2/2012 | Jamison et al. | 709/206 |
| 2013/0246536 A1 * | 9/2013 | Yadava et al. | 709/206 |

* cited by examiner

*Primary Examiner* — Ruolei Zong
(74) *Attorney, Agent, or Firm* — Thomas | Horstemeyer, LLP (57) ABSTRACT

Estimated value ratings for electronic messages such as email may be generated by scraping the content of the email and comparing the scraped content to characteristics of a prospective recipient. The recipient may also provide an actual value rating which may be compared to the estimated value rating. The recipient may also provide a desired value rating which may be compared with the estimated value rating. More effective electronic message marketing may thereby be provided for both senders and recipients.

28 Claims, 7 Drawing Sheets

ESTIMATED VALUE RATINGS FOR ELECTRONIC MESSAGES

BACKGROUND

Online buying and selling of products and services over computer networks, such as the Internet, have continued to proliferate with widespread Internet usage. In order to facilitate the sale of products and services, online sellers of products and services often design marketing campaigns wherein a given campaign message, such as an email, text message and/or instant message, is sent to a given set of recipients.

With the proliferation of email marketing, an industry of Email Service Providers (ESPs) has emerged. An ESP is an entity that provides email marketing or bulk email services. An ESP may provide tracking information showing the status of email sent to each member of an address list. ESPs also often provide the ability to segment an address list into interest groups or categories, allowing a sender to send targeted information to recipients who they believe will value the email. ESPs typically upload subscriber lists from senders for distributing email messages. The lists may be enhanced with custom fields in order to hold additional information for each subscriber for filtering and targeted messaging purposes. A sending engine also may be provided to allow senders to distribute their messages to the subscribers via the ESP.

DETAILED DESCRIPTION

Various embodiments described herein can allow an Email Service Provider (ESP) to generate an estimated value rating for email messages. The estimated value rating may apply to many recipients of the email message, or may be personalized for a given email message and a given recipient.

ESPs generally view their customer as the sender of an email marketing campaign, whereas various embodiments described herein can consider the needs of the recipients by providing estimated value ratings that may be useful to the recipient. Moreover, by generally doing what is right for the recipients, the senders may also benefit through improved sales and/or enhanced reputation.

More specifically, an ESP server for sending email messages from senders to recipients may include an ESP rating generator and an ESP sending engine. The ESP rating generator is configured to generate an estimated value rating for an email message that is received from a sender. The ESP sending engine is configured to send the email message that is received from the sender along with the estimated value rating that was generated by the ESP rating generator, to a recipient. An estimated value rating may be generated per email message. Alternatively, an individual estimated value rating for an individual email message is generated relative to an individual recipient. In some embodiments, the estimated value rating may be given using a "star" rating system that is displayed on the banner of an email message, an estimated "thumbs up/thumbs down" rating that is displayed on the banner of the email and/or other presentation techniques. The ratings may be provided along with an identification of the ESP that has generated the ratings or may be provided without an identification of the ESP that has generated the ratings.

The ESP rating generator can generate an estimated value rating for an email message that is received relative to a recipient by scraping the content of the email message and comparing the content that is scraped to characteristics of one or more recipients. The characteristics of the one or more recipients may include past actions of a recipient in response to past email messages. The characteristics may also include personal information about the recipient, such as demographic information about the recipient.

The ESP sending engine also may be configured to send a placeholder for an actual value rating of the recipient along with the email message and the estimated value rating. The ESP sending engine can receive an actual value rating from a recipient. The actual value rating may be compared to the estimated value rating. The ESP rating generator can instruct the email sending engine to change the sending pattern of a given email message in response to its actual value rating being substantially less than the estimated value ratings. For example, the given email message may be sent to the recipients over an extended time. In these cases, in response to the actual value ratings from recipients that have already received the email message being substantially less than the estimated value ratings, future sending of the email message may be terminated or slowed down. Conversely, if the actual value ratings from those who have received the email are substantially higher than the estimated value ratings, the sending of the given email message to the remaining recipients may be accelerated. Moreover, the ESP rating generator may send a report to the sender in response to the actual value rating being substantially different (either substantially lower or substantially higher) from the estimated value rating for the email message.

The estimated value ratings may also be used to govern the sending of the email messages by the ESP. For example, the ESP rating generator may be configured to instruct the email sending engine to refrain from sending an email message to a recipient in response to the estimated email rating for the email message being below a given value. Thus, ESPs may reduce the sending of unwanted emails to recipients. Moreover, the email sending engine may be configured to receive a message from a recipient, in the form of an email or another form of message, to indicate a desired rating below which the recipient does not wish to receive an email. The ESP rating generator can then instruct the email sending engine to refrain from sending the email message in response to the estimated email rating for the email message being below the desired rating.

Estimated value ratings may also be used outside the ESP environment, and/or for electronic messages other than emails. For example, an electronic message server for sending electronic messages to recipients may include a rating generator that is configured to generate an estimated value rating for an electronic message, and a sending engine that is configured to send the electronic message along with the estimated value rating that was generated by the rating generator to a recipient. The electronic messages may include email, voicemail, text messages and/or multimedia messages, and the ratings may be generated and/or used according to any of the embodiments described herein. In other embodiments, the electronic messages may include social networking messages, such as are sent using social networks, e.g., Facebook™ and/or Twitter™. Thus, for example, a post or tweet may have a value rating associated therewith.

Moreover, content scraping to derive a rating as described above may also be used in contexts other than email marketing. For example, an electronic message rating method may include scraping content of an electronic message and comparing the content that is scraped to characteristics of a prospective electronic message recipient and/or other electronic message recipients to derive an estimated value rating for the electronic message relative to the prospective electronic message recipient. The ratings may be derived and/or used according to any of the embodiments described herein.

Finally, the above discussion has focused on the email sender, such as an ESP. However, email clients may also be provided in which an email receiver is configured to receive an email from an email sender along with an estimated value rating for the email and a placeholder for an actual value rating. The email client may also include a message sender that is configured to send an actual value rating to the email sender in response to receiving the actual value rating in the placeholder. The estimated and actual value ratings may be used according to any of the embodiments described herein. Electronic message clients also may be provided.

Accordingly, various embodiments described herein may provide disruptive technology in the context of email marketing by also considering the needs of the recipients rather than merely considering the needs of the senders. This recipient-focused technology can benefit the senders as well.

Overall Architectures

Figure 1:
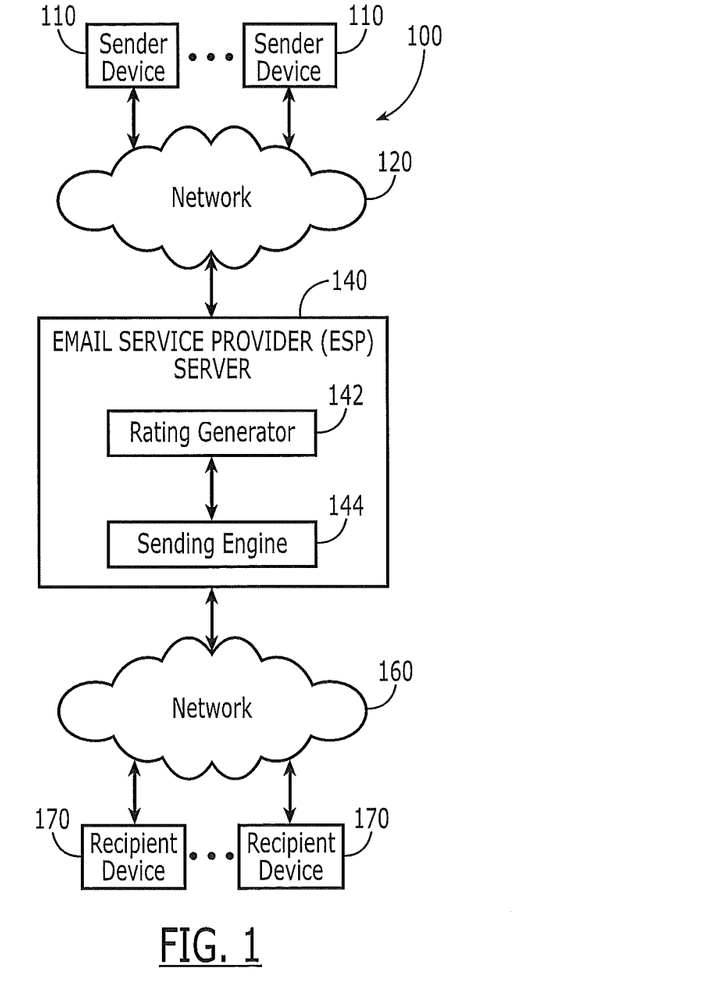
FIG. 1 is a block diagram of systems, devices, methods and computer program products for providing email message estimated value ratings by email service providers according to various embodiments described herein.

FIG. 1 is a block diagram of systems (including devices, such as servers or client devices), methods and/or computer program products for email marketing using estimated value ratings by email senders, according to various embodiments described herein. These systems, devices, methods and computer program products 100 receive email messages and, in some embodiments, a list of potential recipients for the email messages from one or more sender devices 110, and ultimately send the email messages that are received from the senders along with estimated value ratings that are generated to a plurality of recipient devices 170.

As used herein, a campaign generally refers to a single message or a series of related messages that is delivered to many recipients. The message(s) may have identical content for all recipients in some embodiments. However, in other embodiments, the content in the message(s) may be varied depending upon the campaign delivery technique and/or the recipient device capabilities. In yet other embodiments, the content in a campaign message may be personalized for the individual recipient. For example, a readable campaign message may be delivered via email, text message, short message and/or a social networking interface, whereas an audible message may be delivered by voice mail, among other possibilities. As such, although the message may relate to a single campaign, such as a sales campaign for a given book, the content of the message may vary depending upon the mode of delivery. Moreover, recipient devices may generally range from desktop, notebook, netbook, laptop, smartphone, electronic book reader, game console and/or any other embedded device(s) having different processing, connectivity and/or user interface capabilities. As such, the campaign message may also be tailored to the type of recipient device.

A given campaign may be initiated manually and/or programmatically, and may be valid for a short period of time, such as a single day, or for a longer period of time, such as days, weeks, months or more. Moreover, for a given campaign, a list of potential recipients is generated. The list of potential recipients may be generated using various techniques such as the recipient opting into a related campaign, analysis of recipients prior purchasing or browsing activity, and/or random techniques, among other possibilities.

Referring again to FIG. 1, the email messages may originate from one or more sender devices 110. Each sender device 110 may be embodied by one or more enterprise, application, personal, pervasive and/or embedded computer systems that may be standalone and/or interconnected by a public and/or private, wired and/or wireless, real and/or virtual network including the Internet. For shorthand, a sender device 110 may also be referred to herein simply as a "sender" 110. The campaigns may be originated within an enterprise that is selling given goods and/or services or sending messages for other purposes (e.g., news, jokes, social networking, etc.), and/or by third parties external to the enterprise who are selling their goods and services and/or sending messages via the enterprise. In any event, a given campaign may include a campaign message and a list of potential recipients associated therewith. It will also be understood that different parties may generate the campaign message and the list of potential recipients. For example, a third party vendor may originate the campaign message, but the selling enterprise may originate the list of potential recipients. In other embodiments, the list of potential recipients may be jointly generated by the campaign originator 110, based on prior campaigns at other sellers and/or by the seller based on prior campaigns of other campaign originators 110.

An ESP server 140 may be used to generate an estimated value rating for a respective email message that is received from the senders 110, and to send the email messages that are received from the senders 110 along with the estimated value ratings that were generated, to the recipient devices 170. The senders may communicate with the ESP server 140 over a network 120, such as a public and/or private, wired and/or wireless, real and/or virtual network including the Internet.

Continuing with the description of FIG. 1, the ESP server 140 may include a rating generator 142 that is configured to generate an estimated value rating for a respective email message that is received from the senders 110. A sending engine 144 is configured to send the email messages that are received from the senders 110 along with the estimated value ratings that were generated by the ESP generator 142 to the recipient devices 170. The ESP server 140 may communicate with the recipient devices 170 over a network 160, which may be a public and/or private, wired and/or wireless, real and/or virtual network including the Internet, and which may be the same as and/or different from network 120.

The ESP server 140, the rating generator 142 and/or the sending engine 144 may be embodied as one or more enterprise, application, personal, pervasive and/or embedded computer systems that may be standalone and/or interconnected by a public and/or private, real and/or virtual, wired and/or wireless network including the Internet.

Finally, a plurality of recipient devices 170 receive the campaign messages. It will be understood that each of the recipient devices 170 may be embodied as one or more enterprise, application, personal, pervasive and/or embedded computers, such as a desktop, notebook, netbook, laptop, smartphone, electronic book reader, game console and/or any other embedded device. Moreover, a given user may own one or more recipient devices 170 of various configurations and/or may log on to a recipient device that is owned and/or controlled by another entity. For shorthand, a recipient device 170 may also be referred to herein simply as a "recipient" 170.

Figure 2:
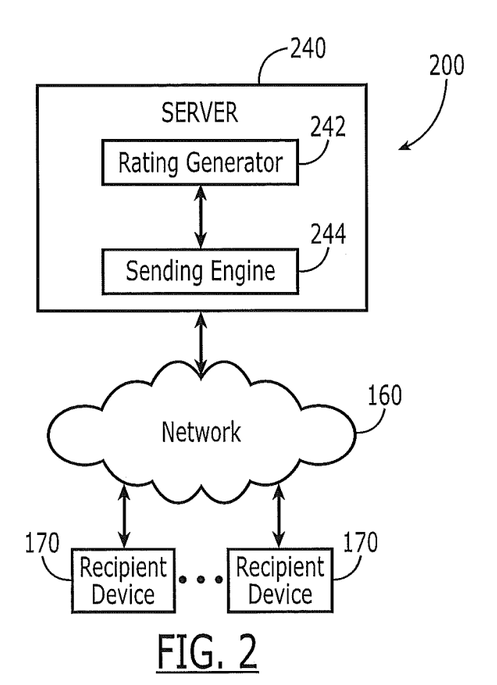
FIG. 2 is a block diagram of systems, devices, methods and computer program products for providing estimated value ratings by message senders according to various embodiments described herein.

FIG. 2 is a block diagram of systems (including devices, such as servers), methods and/or computer program products for sending electronic messages along with estimated value ratings according to various other embodiments described herein. These systems, devices, methods and computer program products 200 can send electronic messages including email, voicemail, text messages and/or multimedia messages to a plurality of recipient devices 170 over a network 160 wherein the messages also include estimated value ratings according to various embodiments described herein. For shorthand, electronic messages may also be referred to herein simply as "messages".

More specifically, a message server 240 includes a rating generator 242 that is configured to generate an estimated value rating for a respective electronic message, and a sending engine 244 that is configured to send the electronic messages along with the estimated value ratings that were generated by the rating generator 242 to the recipients 170. In embodiments of FIG. 2, the electronic messages may originate from within the message server 240. However, in other embodiments, the messages may originate from senders 110 that are external of the message server 240, as was illustrated, for example, in FIG. 1. The message server 240, the rating generator 242 and/or the sending engine 244 may be embodied as one or more enterprise, application, personal, pervasive and/or embedded computer systems that may be standalone and/or interconnected by a public and/or private, real and/or virtual, wired and/or wireless network including the Internet. Accordingly, embodiments of FIG. 2 may provide a non-ESP architecture.

Figure 3:
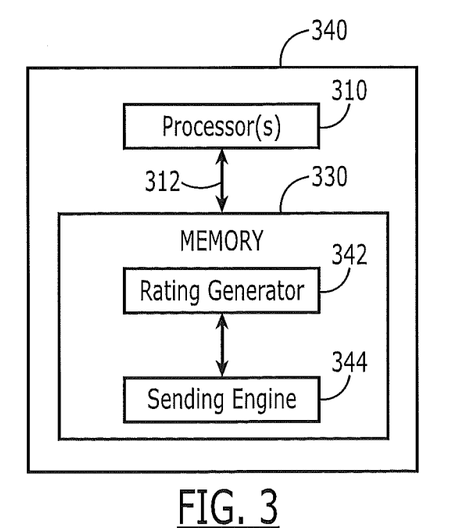
FIG. 3 is a block diagram of a message server according to various embodiments described herein.

FIG. 3 is a block diagram of a server 340, such as an ESP server 140 of FIG. 1 or an electronic message server 240 of FIG. 2. The server 340 may include a processor 310, such as one or more enterprise, application, personal, pervasive and/or embedded computer systems that may be standalone and/or connected by a wired and/or wireless, real and/or virtual, public and/or private network including the Internet. A bus 312 connects the processor with one or more memory devices 330 which may include solid state memory devices (such as static, dynamic, volatile and/or non-volatile solid state memory devices) and/or movable memories (such as rotatable magnetic and/or optical memory devices in the form of discs and/or tapes). The memory devices 330 may be arranged in a hierarchy of devices and may be standalone and/or connected by a wired and/or wireless, real and/or virtual, public and/or private network including the Internet. The memory devices 330 may store a rating generator 342, such as rating generator 142 of FIG. 1 or 242 of FIG. 2, and a sending engine 344, such as sending engine 144 of FIG. 1 or 244 of FIG. 2. The rating generator 342 and/or the sending engine 344 may be embodied by computer-readable program code. However, in other embodiments, the rating generator 342 and/or sending engine 344 may be embodied, at least in part, by special purpose hardware including application-specific integrated circuits.

Email Messages Including Estimated Value Ratings

Figure 4:
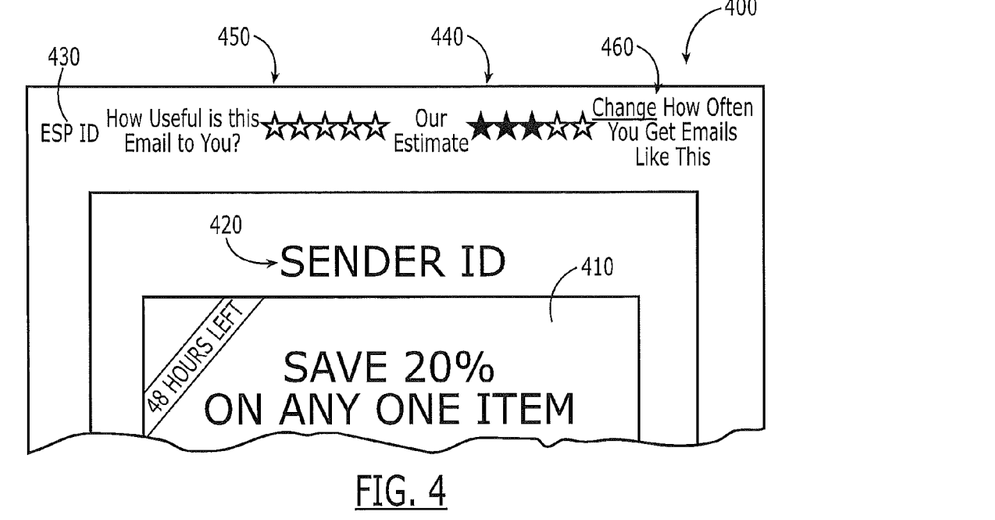
FIGS. 4 and 5 illustrate displays of email messages according to various embodiments described herein.

FIG. 4 illustrates an email message including an estimated value rating that may be generated according to various embodiments of FIG. 1. Referring now to FIG. 4, this email message 400 may include a message 410 from a given sender 110 along with an identification (ID) 420 of the sender 110, such as a sender logo. It will be understood that the sender identification 420 and the sender message 410 may be integrated with one another.

Still referring to FIG. 4, an ESP ID 430 may be provided in a banner for the email. In other embodiments, the ESP ID 430 may be provided in a different area, or need not be provided at all.

An estimated value rating 440 is also provided in the email banner or in another area of the email. The estimated value rating 440 may be calculated according to various embodiments described herein, and may be displayed using, for example, a "star" rating. For example, as illustrated in FIG. 4, a "three out of five star" rating is provided along with the designator "OUR ESTIMATE". It will be understood that other conventional techniques may be used to indicate the rating, such as a thumbs up/thumbs down rating, a numeric rating on a scale, a word rating (e.g., Poor, Fair, Neutral, Good, Excellent), a graphical rating and/or other conventional techniques of representing a rating on a scale. Other designators also may be used.

A placeholder for an actual value rating 450 from the recipient device 170 may also be provided. This placeholder 450 may be used to allow a recipient to rate the value of the email message 400, and the recipient rating may be compared to the estimated value rating 440 as will be described in detail below. The actual value rating 450 may be embodied according to any of the techniques that were described for the estimated value rating 440, and may be accompanied by a designator such as "HOW USEFUL IS THIS EMAIL TO YOU?" or the like. Finally, a placeholder 460 may also be provided to allow a recipient device 170 to change how often the recipient device receives emails like email 400.

It will also be understood that the ESP ID 430, the estimated value rating 450, the placeholder for the actual value rating 440 and the placeholder for changing email frequency 460 are shown in FIG. 4 in a top banner of the email 400. One or all of these fields may be also be provided in a lower banner, elsewhere in the email 400 and/or integrated with the email message 410.

Figure 5:
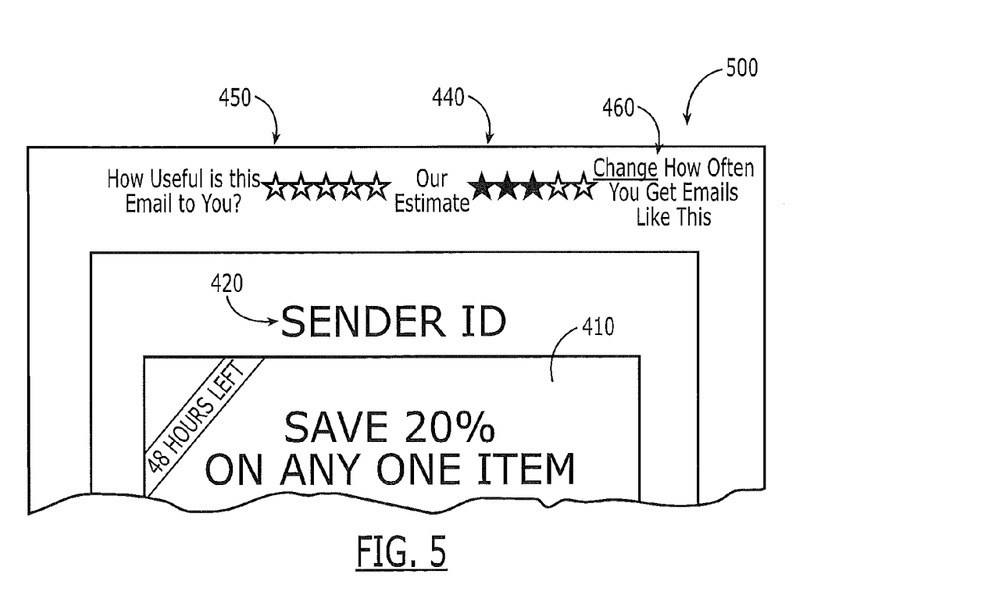

FIG. 5 illustrates an email message 500 that may be provided by various embodiments of the invention according to FIG. 2. In these embodiments, a separate ESP ID is not present, so that the ESP ID 430 of FIG. 4 is not provided. Moreover, the fields 410, 420, 440, 450 and 460 may be provided using other known techniques for non-email electronic messages, such as voicemail, text messages and/or multimedia messages.

Estimated Value Rating Generation

Figure 6:
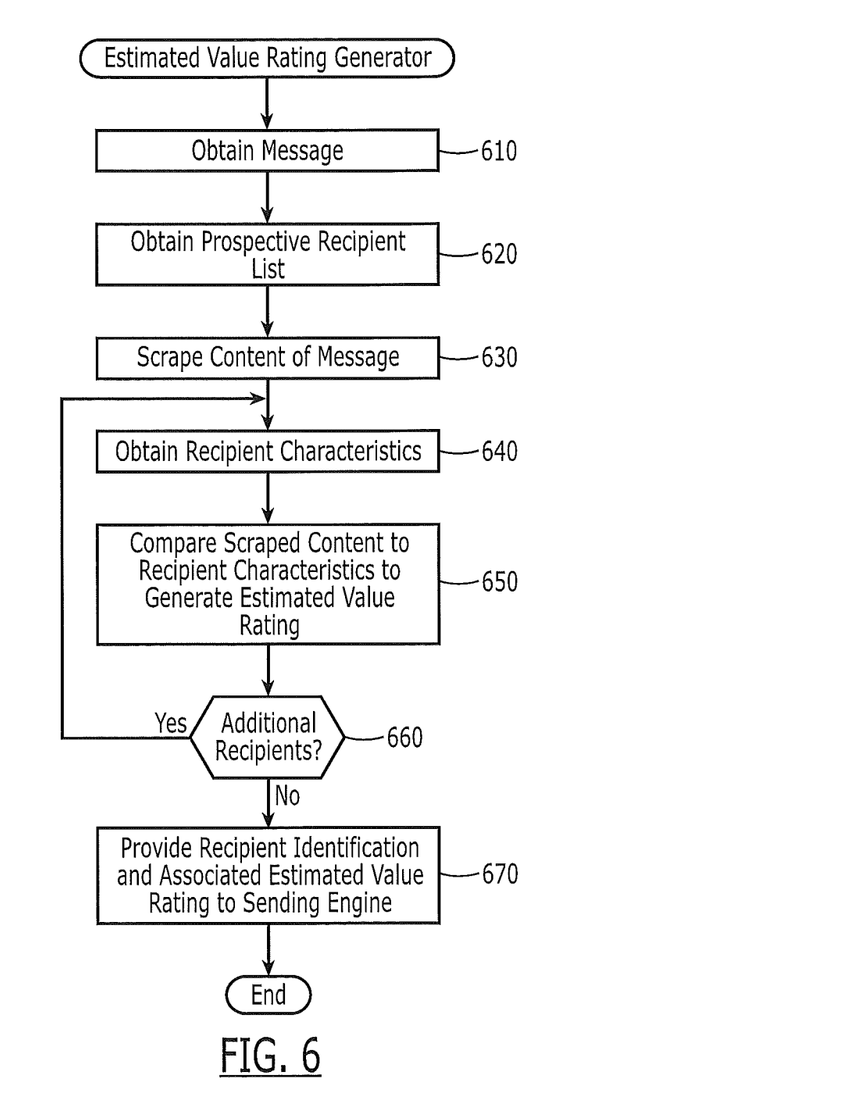
FIG. 6 is a flowchart of operations that may be performed to generate estimated value ratings according to various embodiments described herein.

FIG. 6 is a flowchart of operations that may be performed to generate estimated value ratings according to various embodiments described herein. These operations may be performed by a rating generator 142 of an ESP server 140, by a rating generator 242 of a message server 240 and/or by a rating generator 342 of another server 340 of FIG. 3.

Referring to Block 610, an electronic message, such as an email, is obtained. The electronic message may be obtained from a message sender, and/or may be obtained from a message database within server 240 or 340.

At Block 620, a prospective recipient list is also obtained. In the ESP environment of FIG. 1, the prospective recipient list may be obtained from the sender 110 and/or from the ESP server 140. In non-ESP environments, such as illustrated in FIGS. 2 and 3, the prospective recipient list may be obtained from a recipient database that is stored within and/or accessed by the server 240 and/or 340.

At Block 630, the content of the message is scraped. More specifically, the content of the message may be analyzed to extract key words and/or other features from the content that may be used to characterize the message content. Specifically, various nouns, verbs, images, website links, etc. may be identified that are indicative of the subject matter of the message and/or its intended recipients.

At Block 640, recipient characteristics are obtained. In some embodiments, overall characteristics of a class of prospective recipients are obtained. In other embodiments, individual characteristics of individual recipients are obtained. The recipient characteristics may be provided by the senders 110 along with the prospective recipient list at Block 620, and/or may be obtained and/or generated by the ESP server 140 and/or other server 240/340, for example, by analyzing past actions of a recipient in response to past messages. Examples of recipient characteristics that may be used include an identification of items previously purchased by a recipient, messages previously clicked on by a recipient for investigation, how long it took a recipient to open a previous message for a given type of item, the recipient's demographics, the recipient's geolocation, etc. In other examples, the scraped content may be compared to content of other messages that a recipient has rated favorably and/or compared to the rate of opening of such messages, and the similarity between the current message content and the compared to message content may be used to estimate a rating for the current message. In other examples, this comparison may be made across different recipients using techniques such as collaborative filtering to estimate a given user's preferences on scraped content for a message that the user has not yet seen. Combinations of these and/or other recipient characteristics may be obtained and/or generated at Block 640.

At Block 650, a comparison is made between the scraped content and the recipient characteristics, to generate an estimated value rating. The comparison logic may range from simple to complex, depending, for example, on the amount of scraped content and/or the number of recipient characteristics that are being compared. When multiple factors are used for the comparison, they may be weighted differently or similarly.

At Block 660, if additional recipients are present, the operations at Blocks 640 and 650 are again performed until all recipients have been processed. Finally, at Block 670, a recipient identification and an associated estimated value rating is provided to the sending engine, such as sending engine 144 of FIG. 1, 244 of FIG. 2 or 344 of FIG. 3.

Sending Engine Operation

Figure 7:
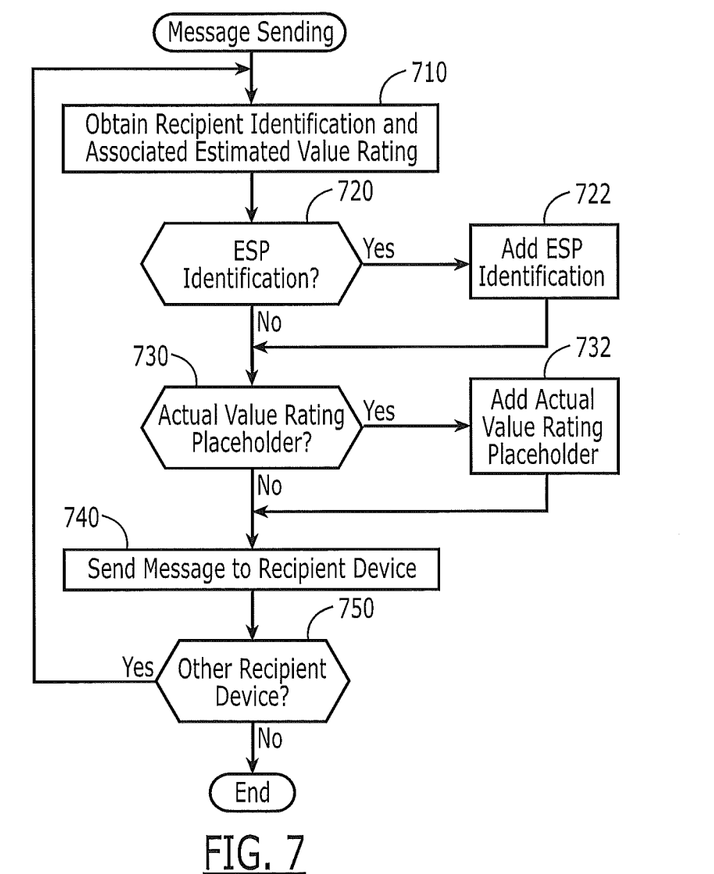
FIG. 7 is a flowchart of operations that may be performed to send email according to various embodiments described herein.

FIG. 7 is a flowchart of operations that may be performed by a sending engine, such as sending engine 144, 244 and/or 344 of FIGS. 1, 2 and/or 3, according to various embodiments described herein. Referring to FIG. 7, the recipient identification and the associated estimated value rating are obtained at Block 710, for example from Block 670 of FIG. 6. If an ESP identification is to be provided at Block 720, it is added at Block 722. Moreover, if an actual value rating placeholder is to be provided at Block 730, it is added at Block 732. Then, at Block 740, the messages are sent. For example, the messages of FIGS. 4 and 5, including the associated estimated value rating 450 and the ESP ID 430, and/or actual value rating placeholder 730, as appropriate, are sent. If other recipient devices are present, at Block 750, operations of Blocks 710-740 are again performed.

Recipient Device Feedback

Figure 8:
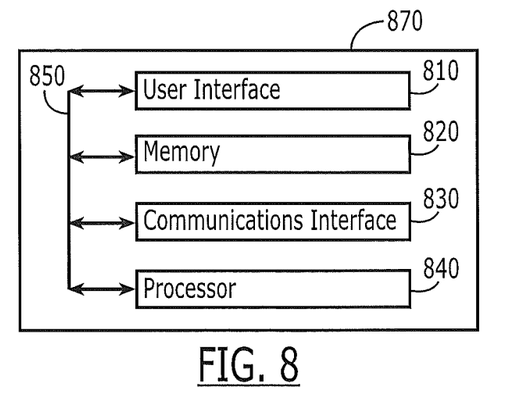
FIG. 8 is a block diagram of a recipient device according to various embodiments described herein.

FIG. 8 is a block diagram of a recipient device 870, which may correspond to a recipient device 170 of FIGS. 1 and 2, and which also may be referred to as a "client device" or simply as a "client" 870, according to various embodiments described herein. The client device 870 may include a user interface 810, a memory 830, a communications interface 830 and a processor 840 that are interconnected by a bus 850. The user interface 810 may comprise a display, keyboard, pointing device, touch screen, microphone, ear speaker and/or loudspeaker, as is well known to those having skill in the art. The memory 820 may comprise a hierarchy of memory devices as was described above for memory 330. The communications interface 830 may include wired and/or wireless communications interfaces. Finally, the processor 840 may be embodied as was described above for processor 310.

Figure 9:
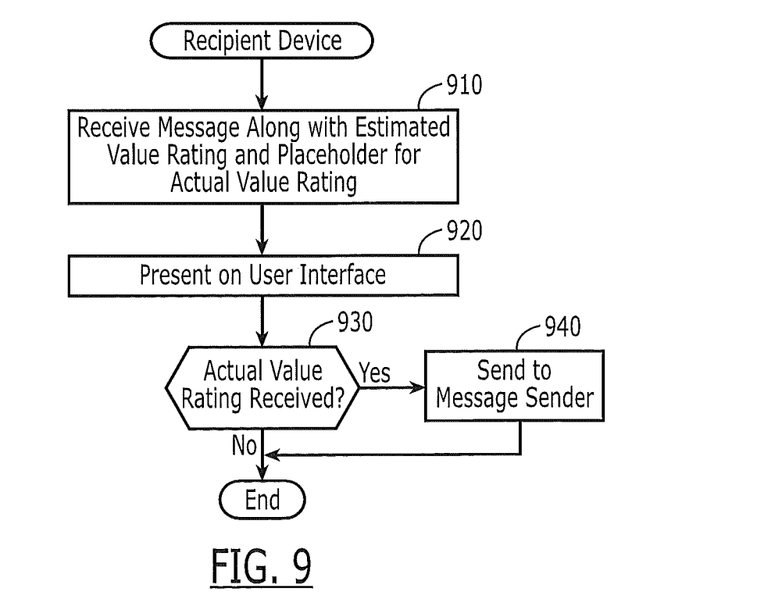
FIG. 9 is a flowchart of operations that may be performed by a recipient device according to various embodiments described herein.

FIG. 9 is a flowchart of operations that may be performed by a recipient/client device 170/870 according to various embodiments described herein, to provide feedback of recipient ratings according to various embodiments described herein. Referring to FIG. 9, at Block 910, a message, such as an email message, is received along with an estimated value rating and a placeholder for an actual value rating. For example, the message may be received from Block 740 of FIG. 7 via the communications interface 830 of FIG. 8. Thus, the communications interface 830 may provide a message receiver or an email receiver that is configured to receive an electronic message, such as an email, from an electronic message sender, such as an email sender, along with an estimated value rating for the electronic message and a placeholder for an actual value rating. The message is presented on the user interface, such as the user interface 810, at Block 920. In some embodiments, messages may be presented on the user interface sorted by their estimated value ratings. Thus, for example, in a social networking context, messages with a relatively high estimated value rating may appear at the top of a list.

Referring now to Block 930, if an actual value rating is received from the recipient, for example via the user interface 810, the actual value rating is sent to the sender device, for example via the communications interface 830, at Block 940. Blocks 930 and 940 may provide an embodiment of an actual value rating sender that is configured to send an actual value rating to the sender device in response to receiving the actual value rating in the placeholder. Accordingly, a feedback mechanism is provided for sending the actual value rating back to the sending engine 144 of FIG. 1, 244 of FIG. 2 and/or 344 of FIG. 3.

Figure 10:
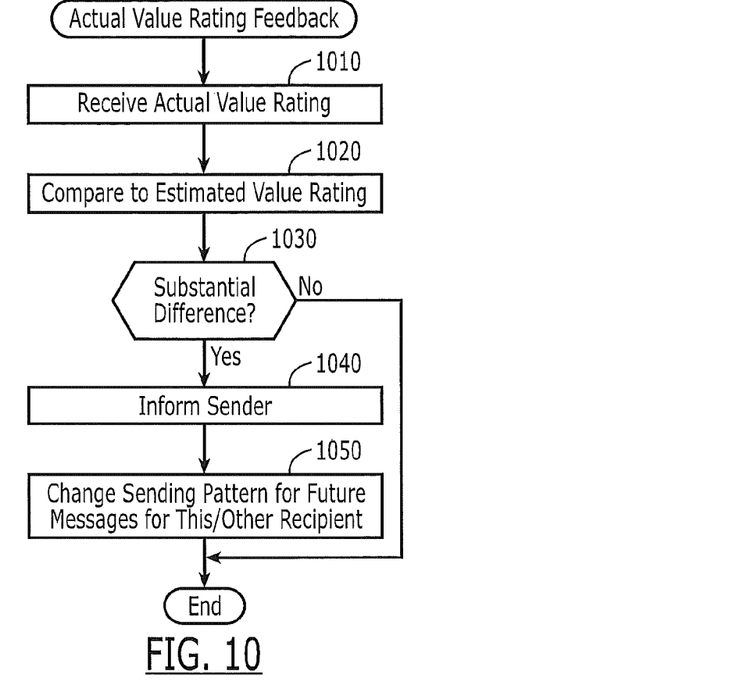
FIG. 10 is a flowchart of operations that may be performed by a recipient device to obtain actual value rating feedback according to various embodiments described herein.

FIG. 10 is a flowchart of operations that may be performed upon actual value rating feedback according to some embodiments described herein. These operations may be performed by the server 140, 240 and/or 340 of FIGS. 1, 2 and/or 3.

Referring now to FIG. 10, at Block 1010, an actual value rating may be received by the sending engine 144, 244, 344 from the communications interface 830. The estimated value rating is compared to the actual value rating at Block 1020. This comparison may be made in the rating generator 142, 242 and/or 342. At Block 1030, if a substantial difference (either substantially lower or substantially higher) is detected, then at Block 1040, a report to the sender may be made. Moreover, at Block 1050, the sending pattern for future messages may be changed for the given recipient and/or for other recipients. For example, the given email message may be sent to the recipients over an extended time. In these cases, in response to the actual value ratings from recipients that have already received the email message being substantially less than the estimated value ratings, future sending of the email message may be terminated or slowed down. Conversely, if the actual value ratings from those who have received the email are substantially higher than the estimated value ratings, the sending of the given email message to the remaining recipients may be accelerated. Thus, the sending of emails may be metered over time and further sending to the given recipient and/or to other recipients may be terminated or increased if feedback indicates that the email has less or more value than was expected.

Figure 11:
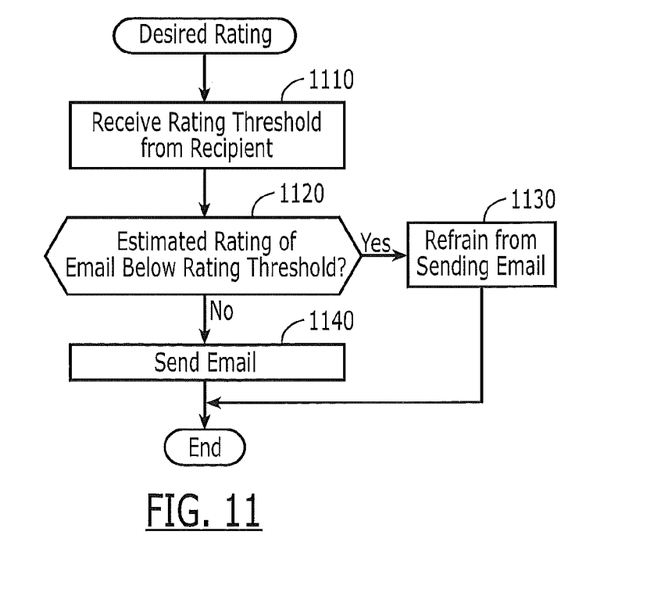
FIG. 11 is a flowchart of operations that may be performed by a message server in response to receiving a desired rating according to various embodiments described herein.

FIG. 11 is a flowchart of other feedback from a recipient. In these embodiments, a recipient may provide input to an email sender, such as an ESP, that the recipient does not wish to receive emails that have an estimated email reading below a desired rating threshold. For example, the recipient may indicate that the recipient only wishes to receive messages with an estimated value rating of three or more on a five star scale. Accordingly, at Block 1110, the sending engine 144, 244, 344 may receive a rating threshold from a potential recipient. The rating threshold may be applied to all emails, may only apply to emails from a given sender, or may only apply to emails related to a given subject matter. At Block 1120, a determination may be made, for example by the rating generator 142, 242, 342, as to whether the estimated rating of the email is below the rating threshold. If so, then at Block 1130, the email is not sent. If not, the email is sent at Block 1140. Accordingly, recipients can specify their tolerance for low value messages, and targeting assistance may be provided for senders.

Other Embodiments

As was described above, various embodiments described herein allow a message sender to generate an estimated value rating for a message, and may also allow a recipient to feed back an actual value rating and/or a desired value rating. These ratings can be helpful for message senders, for message recipients and for ESPs or other intermediate parties.

Senders may currently receive information about whether emails were opened, subscription cancellations and spam reports. By providing senders with rating data, senders can obtain more information about the quality of their individual email campaigns, and can subsequently do a better job at composing and targeting emails. Moreover, adding a rating system can decrease the number of opt-out and spam reports. Presently, the only way for recipients to express their dissatisfaction with a marketing email may be to unsubscribe from the sender email, or to mark the email as spam. By providing recipients the ability to mark an email with a low rating, an emotional outlet may be provided for the recipient to express their dissatisfaction without changing future delivery.

Moreover, value to the recipient may be provided, because people like to rate things. The recipients may feel that their input matters and that they are important. Moreover, if senders act on the ratings, recipients should also receive more relevant emails.

Finally, the ESP or other intermediate provider may have little control over what senders send to their recipients or how often they send marketing emails. If the emails are branded or associated with the ESP in some form, the recipient's negative reaction to a sender's marketing email could spread to tarnish the ESP's brand. However, a rating-based system may cause the recipient to perceive the ESP as doing them a service by helping them filter their marketing emails.

Moreover, a ratings system may also help mitigate spam. For example, the ESP can meter out a sender's email campaign, for example by initially sending to 10% of the recipient list, and can then monitor feedback and use the resulting ratings data to prematurely terminate campaigns with low ratings. Senders would likely appreciate such early termination, as they are likewise concerned with customer perception and would rather send constructive marketing campaigns.

The ESP can also provide targeting assistance to senders by allowing them to filter recipients based on the ESP's estimated rating for the email. Thus, email may only be sent to recipients whose desired rating is greater than a given value. In addition, the recipients themselves can control receipt of emails by automatically filtering out emails whose estimated rating falls below a given level chosen by the recipient.

Various embodiments have been described fully herein with reference to the accompanying figures, in which various embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and were described in detail herein. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element or variants thereof, it can be directly responsive or connected to the other element, or intervening elements may be present. In contrast, when an element is referred to as being "directly responsive" or "directly connected" to another element or variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s)

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A system, comprising at least one processing circuit in at least one computing device, the at least one processing circuit configured to at least:
   generate an estimated value rating for an email message that is received from a sender relative to a recipient by scraping content of the email message that is received and comparing the content that is scraped to characteristics of the recipient;
   send the email message that is received from the sender along with the estimated value rating and a placeholder for an actual value rating to the recipient;
   receive an actual value rating from the recipient;
   compare the actual value rating to the estimated value rating for the email message; and
   change a pattern of sending email messages to the recipient or to other recipients over time in response to the actual value rating being substantially less than the estimated value rating for the email message.

2. A system comprising at least one processing circuit in at least one computing device, the at least one processing circuit configured to at least:
   generate an estimated value rating for an email message that is received from a sender; and
   send the email message along with the estimated value rating to a recipient;
   receive an actual value rating from the recipient;
   compare the actual value rating to the estimated value rating for the email message; and
   change a pattern of sending email messages to the recipient or one or more other recipients over time in response to the actual value rating being substantially less than the estimated value rating for the email message.

3. The system according to claim 2, wherein the estimated value rating is generated relative to the recipient.

4. The system according to claim 2, wherein the at least one processing circuit is further configured to generate the estimated value rating by scraping content of the email message and comparing the content to characteristics of the recipient or the one or more other recipients.

5. The system according to claim 4, wherein the characteristics of the recipient or the one or more other recipients comprise past actions of the recipient or the one or more other recipients in response to past email messages.

6. The system according to claim 2, wherein the at least one processing circuit is further configured to send the email message that is received from the sender along with the estimated value rating and an identification of the system to the recipient.

7. The system according to claim 2, wherein the at least one processing circuit is further configured to send the email message that is received from the sender along with the estimated value rating and a placeholder for the actual value rating to the recipient.

8. The system according to claim 2, wherein the at least one processing circuit computing device is further configured to send a report to the sender in response to the actual value rating being substantially different from the estimated value rating.

9. The system according to claim 2, wherein the at least one processing circuit is further configured to refrain from sending the email message in response to the estimated value rating being below a given value.

10. The system according to claim 2, wherein the at least one processing circuit is further configured to receive a message from the recipient to indicate a rating threshold below which the recipient does not wish to receive the email message; and
refrain from sending the email message in response to the estimated value rating for the email message being below the rating threshold.

11. A computer-implemented method comprising:
generating, by at least one processing circuit in a computing device, an estimated value rating for an email message that is received from a sender;
sending, by the at least one processing circuit in the computing device, the email message along with the estimated value rating to a recipient;
receiving, by the at least one processing circuit in the computing device, an actual value rating from the recipient;
calculating, by the at least one processing circuit in the computing device, an overall rating for a promotional campaign including the email message;
refraining, by the at least one processing circuit in the computing device, from sending a remainder of the promotional campaign in response to the overall rating falling below a threshold; and
changing, by the at least one processing circuit in the computing device, a pattern of sending email messages to the recipient or to one or more other recipients over time in response to an actual value rating being substantially less than the estimated value rating for the email message.

12. The computer-implemented method according to claim 11, wherein the estimated value rating is generated relative to the recipient.

13. The computer-implemented method according to claim 11, wherein generating the estimated value rating comprises:
scraping content of the email message; and
comparing the content to characteristics of the recipient or one or more other recipients.

14. The computer-implemented method according to claim 11, wherein sending the email message comprises sending the email message along with the estimated value rating and a placeholder for the actual value rating to the recipient, and further comprising:
receiving, by the at least one processing circuit in the computing device, the actual value rating from the recipient; and
comparing, by the at least one processing circuit in the computing device, the actual value rating to the estimated value rating for the email message.

15. The computer-implemented method according to claim 11, further comprising refraining from sending the email message in response to the estimated value rating for the email message being below a given value.

16. The computer-implemented method according to claim 15, further comprising:
receiving, by the at least one processing circuit in the computing device, a message from the recipient to indicate a rating threshold below which the recipient does not wish to receive the email message; and refraining, by the at least one processing circuit in the computing device, from sending the email message in response to the estimated value rating for the email message being below the rating threshold.

17. A non-transitory computer-readable medium embodying a program executable in at least one computing device wherein, when executed, the program causes at least one processing circuit in the at least one computing device to at least:
generate an estimated value rating for an email message that is received from a sender; and
send the email message along with the estimated value rating to a recipient;
receive an actual value rating from the recipient;
compare the actual value rating to the estimated value rating for the email message; and
change a pattern of sending email messages to the recipient or one or more other recipients over time in response to the actual value rating being substantially less than the estimated value rating for the email message.

18. The non-transitory computer-readable medium of claim 17, wherein the estimated value rating is generated relative to the recipient.

19. The non-transitory computer-readable medium of claim 17, wherein the program further causes the at least one processing circuit in the at least one computing device to generate the estimated value rating by scraping content of the email message and comparing the content to characteristics of the recipient or the one or more other recipients.

20. The non-transitory computer-readable medium of claim 19, wherein the characteristics of the recipient or the one or more other recipients comprise past actions of the recipient or the one or more other recipients in response to past email messages.

21. The non-transitory computer-readable medium of claim 17, wherein the program further causes the at least one processing circuit in the at least one computing device to send the email message that is received from the sender along with the estimated value rating and an identification of the program to the recipient.

22. The non-transitory computer-readable medium of claim 17, wherein the program further causes the at least one processing circuit in the at least one computing device to send the email message that is received from the sender along with the estimated value rating and a placeholder for the actual value rating to the recipient.

23. The non-transitory computer-readable medium of claim 17, wherein the program further causes the at least one processing circuit in the at least one computing device to report to the sender in response to the actual value rating being substantially different from the estimated value rating.

24. The non-transitory computer-readable medium of claim 17, wherein the program further causes the at least one processing circuit in the at least one computing device to refrain from sending the email message in response to the estimated value rating being below a given value.

25. The non-transitory computer-readable medium of claim 17, wherein the program further causes the at least one processing circuit in the at least one computing device to receive a message from the recipient to indicate a rating threshold below which the recipient does not wish to receive the email message; and
refrain from sending the email message in response to the estimated value rating for the email message being below the rating threshold.

26. The non-transitory computer-readable medium of claim 17, wherein the program further causes the at least one processing circuit in the at least one computing device to calculate an overall rating for a promotional campaign including the email message; and     refrain from sending a remainder of the promotional campaign in response to the overall rating falling below a threshold.

27. The non-transitory computer-readable medium of claim 26, wherein the overall rating is based at least in part on a plurality of actual value ratings associated with the promotional campaign.

28. The system of claim 1, wherein the at least one processing circuit is further configured to at least calculate an overall rating for a promotional campaign including the email message.

\* \* \* \* \*